Figure 5:
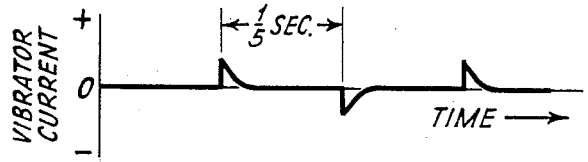

Oct. 10, 1939.  W. H. HAPPE, JR  2,175,690
ELECTRON-RAY TUBE INDICATING INSTRUMENT
Filed May 27, 1938  2 Sheets-Sheet 1
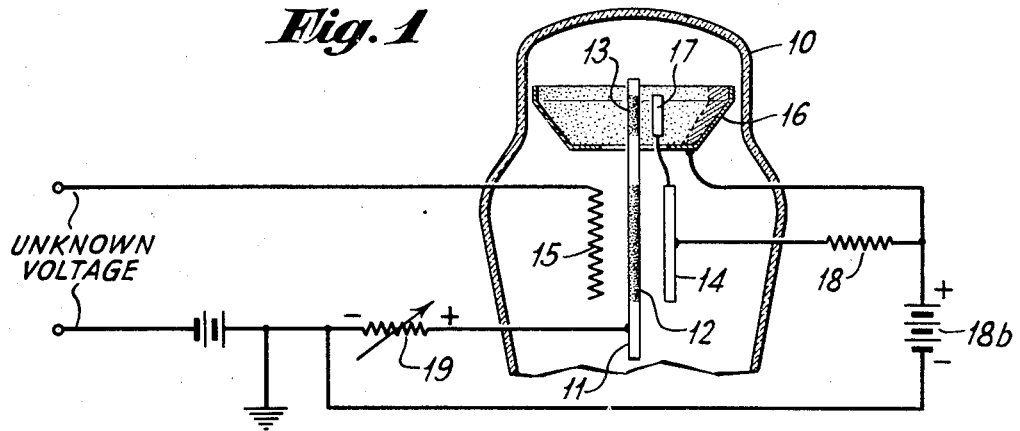
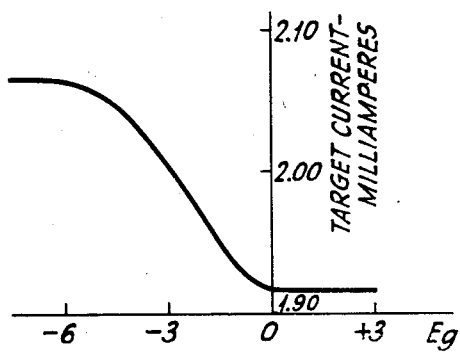
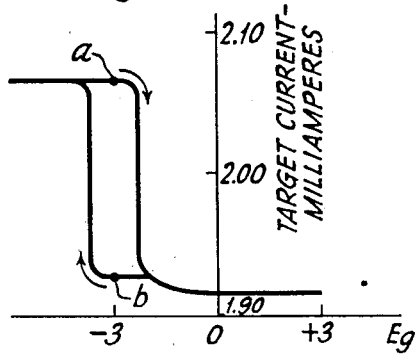
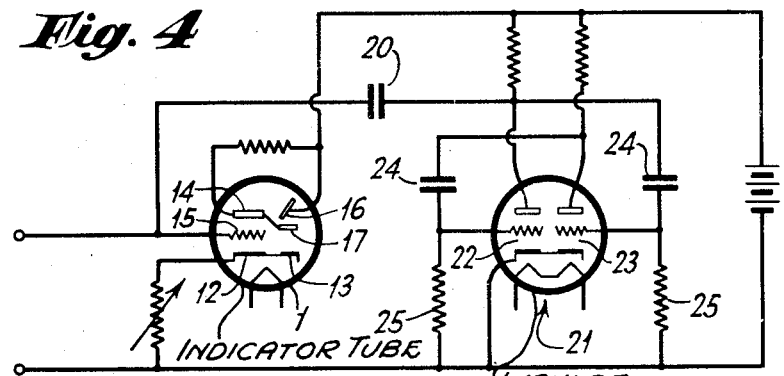
INVENTOR.
WILLIAM H. HAPPE, JR.
BY Charles McClair
ATTORNEY.

Oct. 10, 1939.  W. H. HAPPE, JR  2,175,690
ELECTRON-RAY TUBE INDICATING INSTRUMENT
Filed May 27, 1938  2 Sheets-Sheet 2

INVENTOR
WILLIAM H. HAPPE. JR.
BY Charles McClair
ATTORNEY.

Patented Oct. 10, 1939

2,175,690

UNITED STATES PATENT OFFICE 2,175,690

ELECTRON-RAY TUBE INDICATING INSTRUMENT

William H. Happe, Jr., Brooklyn, N. Y., assignor, by mesne assignments, to Radio Corporation of America, New York, N. Y., a corporation of Delaware Application May 27, 1938, Serial No. 210,337

6 Claims. (Cl. 171—95)

My invention relates to electrical measuring instruments, particularly to circuits with an electron ray tube for visually indicating electrical quantities, such as phase angles of alternating currents, voltages and currents.

Some commercial electron ray tubes used for tuning indicators in radio receiving sets and known in the trade as the 6E5 or the 6G5 comprise a triode mounted in a glass envelope with an auxiliary anode called a target coated with fluorescent material which glows upon electron bombardment, and a focusing electrode between the cathode and target so connected as to change the light pattern on the target in response to voltages impressed on the grid of the triode. The width of the electron shadow cast by the focusing electrode visually indicates the magnitude of the grid voltage. While this device is useful as a vacuum tube voltmeter for many electrical measurements, it is not sufficiently sensitive or flexible in adjustment for some uses, such as balancing a bridge circuit, for example, where expensive galvanometers are commonly used and where extreme sensitivity is required at the balance point of the bridge.

An object of my invention is an electrical measuring device with an electron ray tube for qualitatively and quantitatively measuring electrical values and which is sensitive, flexible in adjustment, and inexpensive to manufacture.

One embodiment of my improved electrical measuring device comprises a tube of the 6E5 or 6G5 type. such as disclosed in the Wagner Patent 2,051,189 issued August 18, 1936, having a resistor connected to the cathode in both the input and output circuits of the tube so that space current produces a voltage drop across the resistor that controls the bias voltage on the input or control grid. The value of the resistance is so chosen that a change in voltage drop produced across the resistor is greater than the grid voltage producing the change. Since the total space current in the 6E5 or 6G5 decreases with an increase in grid potential, thus producing a negative conductance effect, the feedback between the output and input circuits is regenerative, and with a proper value of cathode resistance a small grid voltage change may cause the target current to change suddenly from minimum to maximum current conditions and its shadow pattern to "snap" open or closed. Since a slight change in the grid voltage may produce a sudden and marked change in the light pattern, my improved device may be employed in balancing bridges, in null indicators, in voltage or current limit indicators, and the like.

The novel features which I believe to be characteristic of my invention are set forth with particularity in the appended claims, but the invention itself will best be understood by reference to the following description taken in connection with the accompanying drawings in which Figures 1, 4, 6, 7 and 8 show, diagrammatically, indicating devices constructed according to my invention, and Figures 2, 3 and 5 are curve diagrams showing graphically the operation of my improved device.

One electron ray or indicator tube 1 which may be employed in my novel electrical indicating device and shown diagrammatically in Figure 1 comprises an evacuated envelope 10 containing a cathode 11 with electron emitting sections 12 and 13. In the lower section of the tube are the electrodes of a conventional amplifier including an anode 14 to receive electrons from cathode section 12, the current to the anode being controlled by grid 15. Around and concentric with the upper electron emitting section 13 is auxiliary anode or target 16, preferably dish-shaped and interiorly coated with a material which fluoresces when bombarded with electrons. Connected to and preferably supported by the anode 14 is a rod or fin-shaped ray-control electrode 17 parallel to the cathode. Current to anode 14 from a high voltage source 18b passes through resistor 18 of high ohmic value, such as one megohm, and the anode circuit is completed through cathode resistor 19, preferably of the variable type. Current flowing to the anode 14 through resistor 18 produces a voltage drop which determines the potential of ray-control electrode 17 with respect to the cathode. If the value of resistance 19 is relatively low an increase in a positive direction of grid voltage increases the anode current, increases the drop across resistor 18, lowers the potential of ray-control electrode 17, increases the deflection of electrons from section 13 and widens the shadow angle on target 16.

Tubes of this type have been used extensively as vacuum tube voltmeters and as tuning indicators in radio receiving sets where they show resonant conditions in the set by the shadow angle. The target current in such applications of the tube varies uniformly with changes in the grid voltage as represented in Figure 2. With a change in grid voltage, a change in plate current to anode 14 results which is less than the change in current to target 16, so that a current meter connected in series with battery 18b will actually show a decrease in battery current with an increase in grid voltage.

If, however, the cathode resistor 19 is increased to a sufficiently high value the regenerative voltage across resistor 19, caused by the negative conductance characteristic of the tube, may be sufficient to carry, unassisted, the grid voltage in the direction the grid voltage was first initiated. If, for example, the cathode of a commercial tube of the 6E5 type were connected to a resistor 19 of about 20,000 ohms and if, with a static bias on the grid of about −3 volts, the grid voltage were increased in a positive direction from point a in Figure 3, the decrease in target current would be so marked as to cause a sudden decrease in the drop across resistor 19, permit a substantial rise in control grid voltage, and snap the shadow to maximum open angle. If now the control grid voltage is driven negatively a small amount from the value represented at b, Figure 3, the target current would suddenly increase, increasing the drop across resistor 19, drive the grid voltage suddenly negative, and snap the shadow angle to zero. In order to produce the substantially vertical slope of the grid voltage—plate current characteristic, an increment of grid-to-ground voltage change must cause the increment of voltage drop across the cathode resistor, occasioned by the change in plate current by the target and the main anode, to exceed the incremental grid-to-ground voltage. A change in voltage drop across resistor 19 caused by a change in grid voltage must be greater than said grid voltage change times the gain of the tube in order to cause the shift of the plate current from one extreme value to the other.

It is desirable that the target current snap or change suddenly from one value to another by precisely the grid voltage indicated at a or b, Figure 3, and to eliminate the hysteresis effect and the necessity for even an incremental change in grid voltage from value a or b to initiate the full swing of target current. For this purpose I propose to impress upon the grid of the indicator tube impulses which will modulate the direct current grid voltage. Such a modulator 21 is shown in Figure 4, the generated wave form of which is shown in Figure 5. The input circuit of my improved indicator device is coupled through condenser 20 to the output of an impulse generator or modulator 21 designed to generate a current which at regular intervals consists first of positive impulses alternated with negative impulses. The amplitude of the impulses is preferably equal to the voltage between points a or b, Figure 3, and the knee of the curve. This generator may conveniently comprise a tube with two triode sections 22 and 23, the grid of one section being coupled through a relatively large condenser 24 to the anode of the other section. Condensers 24 are alternately charged by the space current of the tube and discharged through leakage resistors 25. By impressing the wave form of Figure 5 upon grid 15 the shadow angle or target 16 snaps open or closed the instant the direct current grid voltage is brought to the value represented at point a or b in Figure 3.

Commercial applications of my improved indicator become immediately apparent. If, for example, the input is connected across the diagonals of a bridge the direction of unbalance is indicated by the shadow angle which will be fully opened by unbalance in one direction and completely closed for unbalance in the other direction. The instant balance is reached in the bridge, when the voltage reaches a or b, the shadow angle snaps closed or open depending on its previous position.

Figure 6:
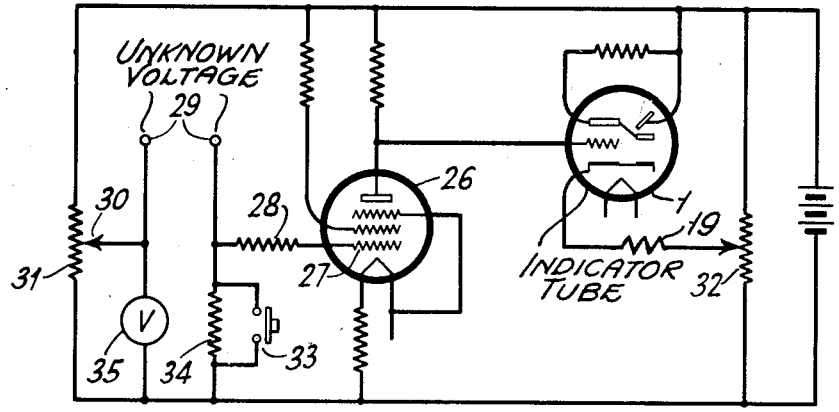

As a null indicator my improved device is particularly efficient in indicating balance between known and unknown voltages or currents. In Figure 6, for example, a convenient balancing circuit is shown for directly measuring unknown voltages. The input of the indicator tube is directly connected to the output of amplifier 26, the two tubes being connected across a high voltage plate supply. The plate of the amplifier is directly connected to the grid of the indicator tube and the control grid 27 of the amplifier tube is connected through a resistor 28 to one of the test terminals 29, the other test terminal being connected to the movable contact 30 on a potentiometer 31 across the plate supply. The shadow angle may be adjusted to flicker or to the threshold of either the open or closed position by the contact of potentiometer 32 when the push button switch 33 is closed, and the contact 30 may then be adjusted, when switch 33 is open, to produce a balance between the unknown voltage across 29 with the voltage across the lower leg of the potentiometer. When the voltage across the lower leg of the potentiometer is equal and opposite to the unknown voltage, the current through resistor 34, preferably of some high value such as several megohms, is zero and the shadow angle indicates balance just as when resistor 34 was shorted. The voltmeter reading at 35 is then a direct reading of the unknown voltage.

A distinct null indication may further be conveniently obtained by energizing the tube with alternating current of commercial voltage and frequency. If, for example, the target is connected to ground through a 60 cycle source of alternating current, the shadow angle will flicker through its maximum swing 60 times per second. The visual effect then is an area of half brilliancy, its margins being distinctly outlined by the full brilliancy of that area of the target unaffected by the ray-control electrode.

Figure 7:
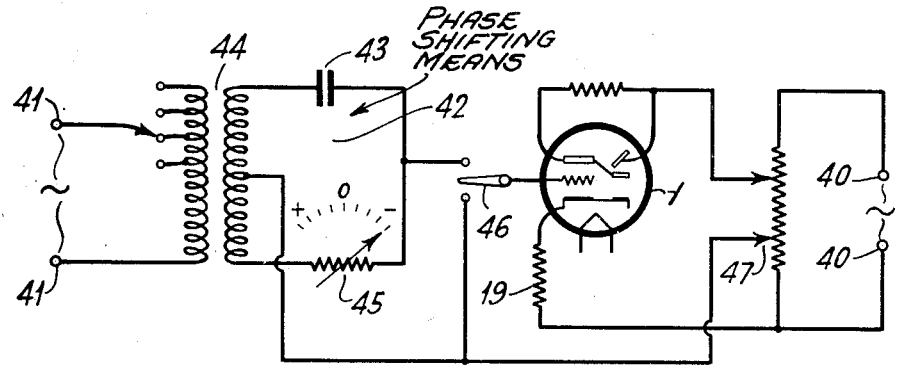

In Figure 7 is shown a device embodying my invention for measuring the phase displacement between two alternating currents and for indicating which current lags or leads the other. Test terminals 40 are connected to one a-c source and test terminals 41 are connected to the other a-c source which is to be compared in phase to the first. The target and anode of the electron ray tube are energized preferably through a potentiometer connected between terminals 40, one end of the potentiometer being connected to the cathode through resistor 19. The other alternating current source is impressed upon the input of the tube through a calibrated phase shifting device 42 comprising condenser 43 and secondary winding 44 connected in series with the variable resistor 45. An indicating knob on resistor 45 is preferably adjusted so that its pointer indicates zero in the center of a scale marked off on either side in degrees. In the center or zero position of the knob the resistance of resistor 45 is equal to the impedance of condenser 43 so that at balance no voltage exists between the junction of the resistor and condenser and the center tap of the secondary winding. The armature of switch 46 is first moved to its lower contact and slidable contact 47 on the anode potentiometer is adjusted to bring the control grid voltage to value a or b, at which voltage the shadow angle flickers at the frequency of the alternating current applied to terminals 40. Then upon moving the armature of switch 46 to the upper contact, the knob of calibrated resistor 45 is adjusted to either side of its zero point to bring the alternating current impressed upon the grid in phase with the voltage impressed upon the target, whereupon balance is again indicated by the flickering movement of the shadow angle and the phase relation of the two voltages at 40 and 41, and the lag or lead of those voltages is indicated directly on the scale of the resistor.

Figure 8:
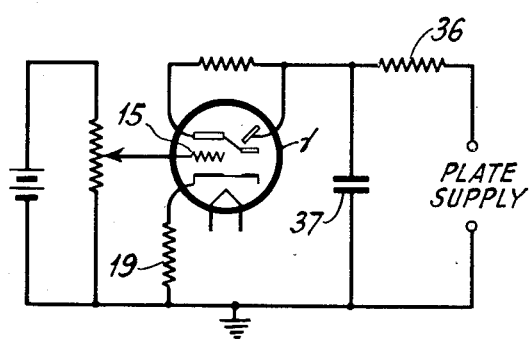

In Figure 8 is shown another form of null indicator in which the shadow angle may be caused to flicker constantly when the control grid voltage is brought to value $a$ or $b$. In this construction the target is connected to its high voltage source through resistor 36. Upon the application of an incremental change in the control grid voltage which, for example, decreases the target current, the drop through resistor 36 increases the voltage of the target thus tending to increase the space current in the tube or produce degeneration as distinguished from the regenerative effect produced in resistor 19. In operation, then, the application of voltage $a$ or $b$ to the control grid causes the shadow angle to flicker open and closed at a high rate of speed. If it is desired that the speed of flicker be reduced, a stabilizing condenser 37 may be connected between the target and ground. The increased time constant of the plate circuit produced by this condenser and resistor 36 may be adjusted to make the flicker frequency any desired value. With the value of resistor 36 at 20,000 ohms and the capacity of condenser 37 at 16 microfarads, the speed of flicker is approximately 4 or 5 per second.

My electrical measuring device is sensitive, flexible in adjustment, inexpensive to manufacture, and is particularly adapted for measuring electrical quantities such as voltages, currents and phase angles.

I claim:

1. A visual electrical measuring device comprising an electron source, a target with a coated surface which fluoresces when bombarded with electrons exposed to said source, a ray-control electrode between said source and target for controlling the electron current to said target and the area of said target fluoresced by said electrons, a source of voltage connected between said electron source and said target, and means for substantially changing said area in response to an incremental voltage change on said ray-control electrode comprising means for impressing on the ray-control electrode a voltage change generated by said electron current of greater magnitude and of the same polarity as the incremental voltage initiating the change in said area.

2. A device for visually measuring voltages comprising an electron source, a target with a coating which fluoresces when bombarded with electrons exposed to said source, a ray-control electrode between said source and target for controlling the total electron current to said target and the area of the target fluoresced by the electrons, a source of voltage connected between said electron source and said target, means for substantially changing said area in response to an incremental voltage change on said ray-control electrode comprising an amplifier with input and output electrodes, said output electrodes being connected to said electron source and ray-control electrode, and means for impressing a voltage on said input electrodes proportional to said electron current.

3. An electrical measuring device for visually indicating electrical quantities comprising a source of electrons, a metal target with a fluorescent surface sensitive to electron bombardment facing said source, an electrode between said source and target for determining the portion of said surface bombarded by electrons, an amplifier for controlling the potential of said electrode comprising a cathode, grid and anode, said anode being connected to said electrode, and said cathode being connected to said electron source, means for suddenly changing the bombarded area of said target in response to an incremental change in grid voltage comprising a high voltage source and a resistor connected in series between said electron source and target, and means for impressing the voltage drop across said resistor on said grid.

4. An electrical measuring device comprising an electron discharge device having an envelope enclosing an electron emitting cathode, a target with a surface which glows when bombarded with electrons exposed to said cathode, and a ray-control electrode comprising a conductor parallel to the cathode between said cathode and said target for determining the area of the surface of said target reached by electrons from said cathode, a cooperating grid and anode surrounding another portion of said cathode, said anode being connected directly to said ray-control electrode and a resistor between said target and anode, a second resistor and a high voltage source connected in series between said cathode and the target, two unknown voltage source terminals, one being coupled to said grid and the other being connected to the junction of said second resistance and high voltage source.

5. An electrical indicating device comprising an electron source, a target with a coating which fluoresces when bombarded with electrons exposed to said source, a ray-control electrode between said source and target for controlling an electron current to said target and the area of the target fluoresced by the electrons, a source of voltage between said electron source and target, an amplifier for controlling the potential of said ray-control electrode comprising a cathode, grid and anode, said anode being connected to said ray-control electrode and said cathode being connected to said electron source, means for substantially changing the bombarded area of said target in response to an incremental change in grid voltage comprising a resistor connected in series with said high voltage source between said target and cathode, means for impressing the voltage drop across said resistor between said grid and cathode, and a generator of alternating positive and negative potential impulses, the output of said generator being coupled to said grid and cathode.

6. An electrical measuring device comprising an electron source, a target with a coated surface which fluoresces when bombarded with electrons exposed to said source, a ray-control electrode between said source and a target for controlling the area of said target fluoresced by said electrons, an amplifier for controlling the potential of said ray-control electrode comprising a cathode, grid and anode, said anode and cathode being connected to said ray control electrode an said electron source, means for continually changing the bombarded area of said target in response to an incremental change in grid voltage comprising two resistors connected in series with a high voltage source between said target and said cathode, means for applying the voltage drop across one of said resistors to said grid, the other resistor having sufficiently high value to lower the potential of said target upon an increase in electron current to the target.

WILLIAM H. HAPPE, Jr.